(12) United States Patent
DuBreuil

(10) Patent No.: US 10,498,790 B2
(45) Date of Patent: Dec. 3, 2019

(54) SYSTEMS AND METHODS FOR MULTICAST DELIVERY OF A MANAGED BUNDLE IN SERVICE PROVIDER NETWORKS

(71) Applicant: ARRIS Enterprises, Inc., Suwanee, GA (US)

(72) Inventor: Thomas L. DuBreuil, Ivyland, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 255 days.

(21) Appl. No.: 14/819,629

(22) Filed: Aug. 6, 2015

(65) Prior Publication Data

US 2016/0044080 A1    Feb. 11, 2016

Related U.S. Application Data

(60) Provisional application No. 62/034,236, filed on Aug. 7, 2014.

(51) Int. Cl.
*H04L 29/06* (2006.01)
*H04N 21/2343* (2011.01)
*H04N 21/262* (2011.01)
*H04N 21/6405* (2011.01)
*H04N 21/845* (2011.01)

(52) U.S. Cl.
CPC ........ *H04L 65/602* (2013.01); *H04L 65/4076* (2013.01); *H04L 65/605* (2013.01); *H04L 65/607* (2013.01); *H04N 21/23439* (2013.01); *H04N 21/234354* (2013.01);

(Continued)

(58) Field of Classification Search
CPC ......... H04N 21/47202; H04N 21/2365; H04N 21/6405; H04L 65/4084; H04L 65/407
See application file for complete search history.

(56) References Cited

U.S. PATENT DOCUMENTS 9,154,854 B1 * 10/2015 Straub .................. H04N 21/814
2008/0301746 A1 * 12/2008 Wiser .................. H04N 7/17318
725/114

(Continued)

FOREIGN PATENT DOCUMENTS

WO    2014/063726 A1    5/2014

OTHER PUBLICATIONS

PCT Search Report & Written Opinion, RE: Application No. PCT/US2015/043961; dated Oct. 12, 2015.

*Primary Examiner* — Jeong S Park
(74) *Attorney, Agent, or Firm* — Thomas A. Ward

(57) ABSTRACT

A method is provided for distributing video content by a network operator. The method includes receiving media streams including programs having a prescribed duration; assigning a traffic index for each program contained within the media streams, each traffic index reflecting the volume of traffic expected to be associated with the program by client devices; selecting a predetermined number of programs to provide to client devices based at least in part on the traffic index for each program; encoding said selected program as individual adaptive bitrate streams; and streaming said encoded individual adaptive bitrate streams to client devices over the network as a managed bundle, wherein the adaptive bitrate streams in the bundle are multicast simultaneously to the client devices.

16 Claims, 11 Drawing Sheets

(52) U.S. Cl.
CPC ... *H04N 21/26216* (2013.01); *H04N 21/6405* (2013.01); *H04N 21/8456* (2013.01); *H04L 65/4084* (2013.01)

(56) References Cited

U.S. PATENT DOCUMENTS

| | | | | |
|---|---|---|---|---|
| 2010/0017833 | A1* | 1/2010 | Abramson | H04L 12/2801 725/111 |
| 2011/0083154 | A1* | 4/2011 | Boersma | H04N 21/4334 725/109 |
| 2011/0126248 | A1* | 5/2011 | Fisher | H04N 7/17318 725/95 |
| 2013/0179589 | A1 | 7/2013 | McCarthy et al. | |
| 2013/0311408 | A1* | 11/2013 | Bagga | G06N 20/00 706/12 |
| 2014/0020037 | A1* | 1/2014 | Hybertson | H04N 21/2365 725/109 |
| 2015/0156249 | A1* | 6/2015 | Draznin | H04L 12/189 709/204 |

\* cited by examiner

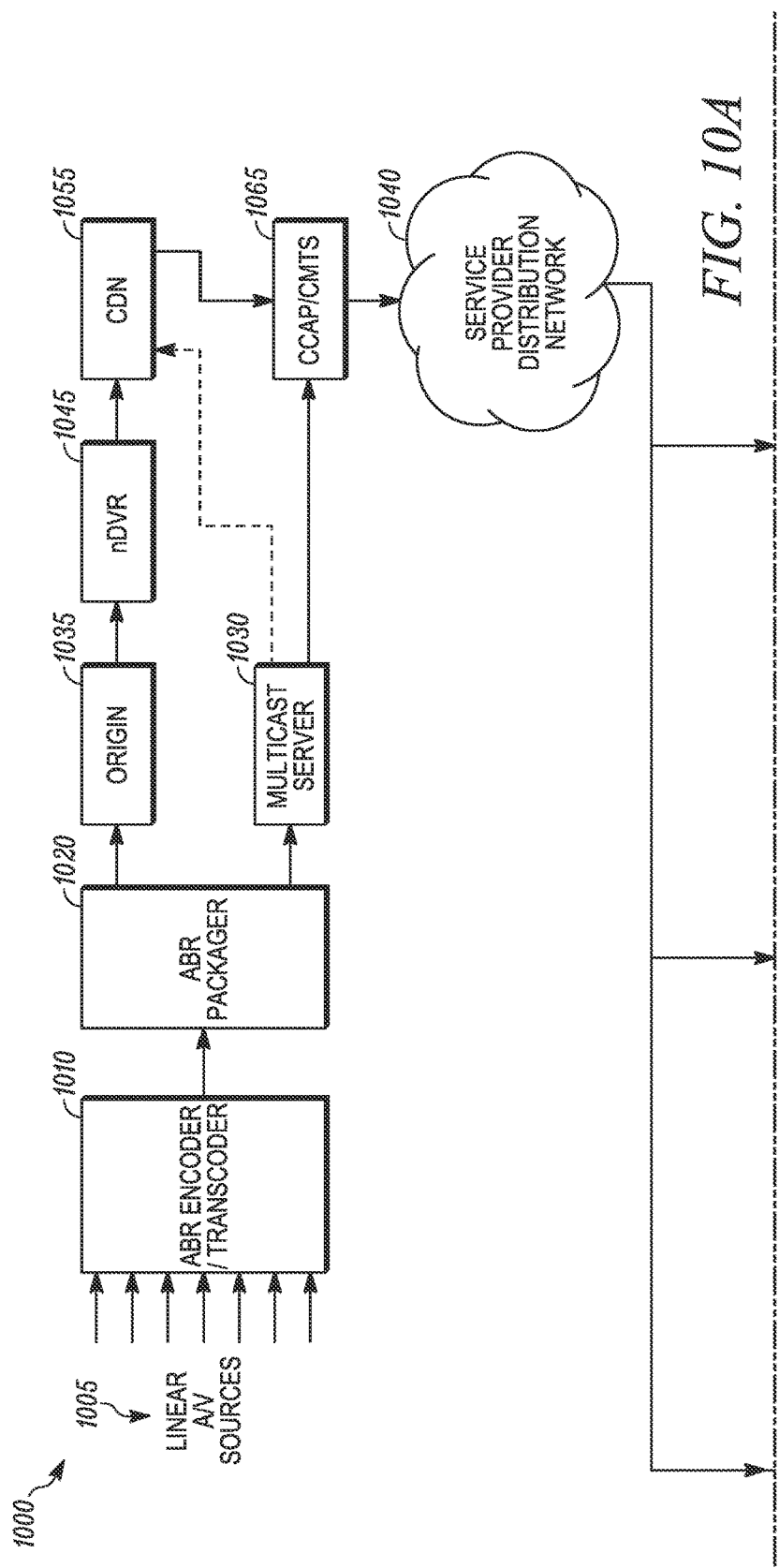

SYSTEMS AND METHODS FOR MULTICAST DELIVERY OF A MANAGED BUNDLE IN SERVICE PROVIDER NETWORKS

CROSS-REFERENCES TO RELATED APPLICATIONS

The present disclosure claims priority to U.S. Provisional App. No. 62/034,236, entitled "Adaptive Bit Rate (ABR) Statistical Multiplexing (Stat Muxing)", filed Aug. 7, 2014, the contents of which is incorporated herein by reference in its entirety.

FIELD

The disclosure relates generally to the field of multicast delivery of content to client devices, and more specifically to multicast of popular linear content in a service provider's network to client devices.

BACKGROUND

With advances in digital data transmission techniques and digital video compression such as used in the MPEG standards (e.g., MPEG-2, MPEG-4), it is possible to deliver several digitally compressed video programs in the same bandwidth that is otherwise occupied by a single analog television (TV) channel. These capabilities provide opportunities for programming service providers (e.g., broadcasters such as CNN, ABC), network operators e.g., cable and satellite network owners), and client devices.

In a multi-program transmission environment, several programs (e.g., channels) are coded, multiplexed and transmitted over a single communication channel. Since these programs share a limited channel capacity, the aggregate bit rate of the programs must be no greater than the communication channel rate. In order to optimize the quality and efficiency of the program transmission process, the bit rate of the program or video streams can be varied as needed to manage the utilization of network bandwidth.

One video transmission technique that may be used to manage bandwidth is statistical multiplexing, which combines several programs each including a compressed video bit stream into a single multiplexed bit stream, e.g., for transmission of a plurality of programs on a single frequency. In this manner a service provider may provide more programs to a subscriber base using the same network infrastructure, e.g. providing four programs in the same network infrastructure that would have previously provided a single program. For a given level of video quality, the bit rate of a given compressed stream generally varies with time based on the complexity of the corresponding video signals. A statistical multiplexer attempts to estimate the complexity of the various video frame sequences of a video signal and allocates channel bits among the corresponding compressed video bit streams. In some cases the bits are allocated so as to provide a desired (e.g., approximately constant) level of video quality across all of the multiplexed streams. For example, a given video frame sequence with a relatively large amount of spatial activity or motion may be more complex than other sequences and therefore allocated more bits than the other sequences. On the subscriber side, a network element, such as set top box, pulls the desired program out of the multiplex stream by use of a tuner to tune to the multiplex frequency and a decoder to decode the desired program such as by using its associated program ID (PID).

Another technique that may be used to manage bandwidth involves adaptively streaming data as streaming media. Streaming media differs from ordinary media in the sense that streaming media may be played out as soon as it is received rather than waiting for the entire file to be transferred over the network. One advantage associated with streaming media is that it allows the user to begin viewing the content immediately or on a real-time basis with rather short delay. In contrast, simply downloading a media file to a customer, which is a very effective technique to manage bandwidth because it allows for very wide swings in bit rate, does not allow the user to begin viewing the content on a real-time basis. The downloaded media must also be stored prior to playback, requiring significant and often expensive storage capabilities on the subscriber device. This delay and associated additional expense may be unacceptable to customers, thereby making streaming media more attractive.

In adaptive streaming, the encoded bit rate of a media data stream is dynamically adjusted depending on specific network conditions. To achieve this, the streaming client continuously estimates the current state of the network and adjusts the requested bit rate from the server upward or downward depending on the available bandwidth associated with that particular streaming communication frequency data link.

One problem with media streaming architectures is the tight coupling that is required between the streaming server and client. The communication between the client and server that streaming media requires creates additional server overhead, because the server tracks the current state of each client. Significantly, this limits the scalability of the server as the number of media data streams being streamed increases. In addition, the client cannot quickly react to changing conditions, such as increased packet loss, reduced bandwidth, user requests for different content or to modify the existing content (e.g., speed up or rewind), and so forth, without first communicating with the server and waiting for the server to adapt and respond. Often, when a client reports a lower available bandwidth, the server does not adapt quickly enough causing breaks in the media to be noticed by the user on the client as packets that exceed the available bandwidth are not received and new lower bit rate packets are not sent from the server in time. To avoid these problems, clients often buffer data, but buffering introduces latency, which for live events may be unacceptable.

Accordingly, neither statistical multiplexing nor adaptive streaming is fully satisfactory methods of managing bandwidth in a network.

SUMMARY

There are provided herein systems and methods that allow for a statistical multiplexing concept and adaptive streaming to be used together to manage bandwidth in a manner that can overcome the aforementioned problems.

In a first aspect, a method of distributing content by a network operator is disclosed. The method includes: receiving a plurality of media streams including a plurality of programs having a prescribed duration; assigning a traffic index for each program contained within the media streams, each traffic index reflecting the volume of traffic expected to be associated with the program by client devices; selecting a predetermined number of programs to provide to client devices based at least in part on the traffic index for each program; encoding said selected programs as individual adaptive bitrate streams; and streaming said encoded individual adaptive bitrate streams to client devices over the network as a managed bundle, wherein the adaptive bitrate streams in the bundle are multicast simultaneously to the client devices.

In a second aspect, an apparatus for distributing content to a plurality of users is disclosed. The apparatus includes: an adaptive bit rate (ABR) transcoder for receiving video streams from a content provider, each video stream having a plurality of programs, the transcoder configured to provide each program in an individual adaptive bit rate (ABR) stream; a rate control processor in communication with said transcoder for, the rate control processor configured to assign a predetermined number of programs into a managed bundle; an adaptive bit rate (ABR) packager in communication with the transcoder, the packager configured to segment the programs in the managed bundle into discrete time segments; and a multicast server for providing the individual adaptive bitrate (ABR) streams in the managed bundle to client devices simultaneously.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

Figure 1:
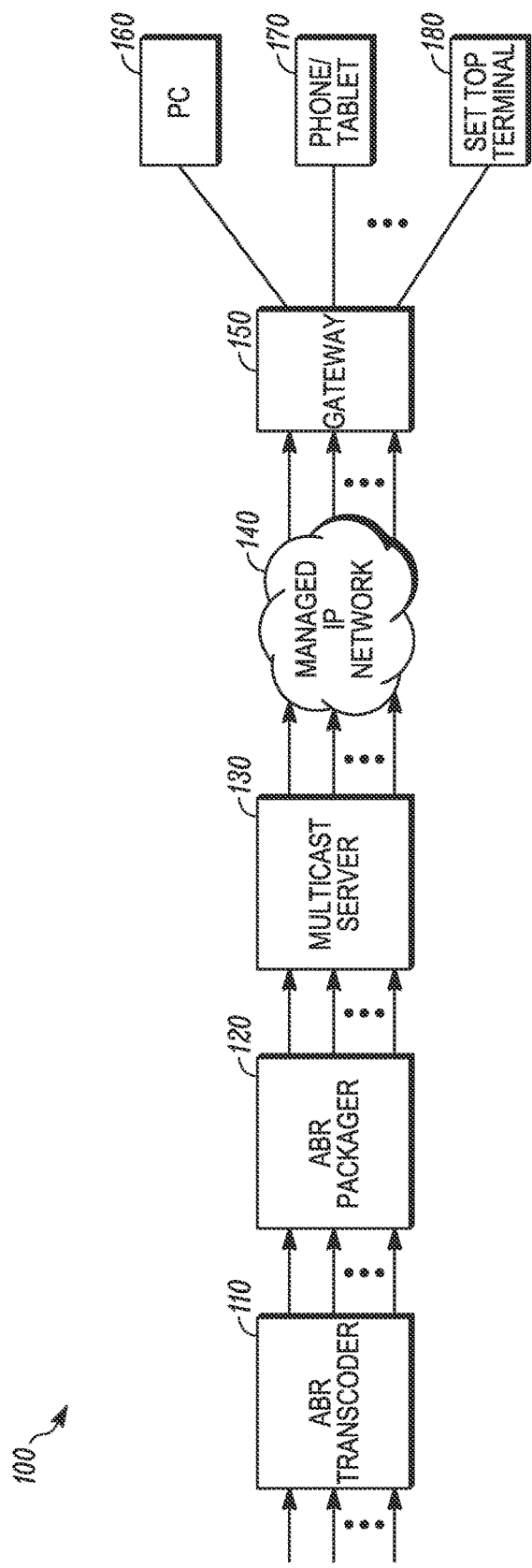
FIG. 1 shows an example of an architecture that can be used to deliver video and other content and services to users associated with a variety of different client devices in accordance with an embodiment of the disclosure.

In the past few decades, advances in the related fields of video compression and video transmission systems have led to the widespread availability of digital video programs transmitted over a variety of communication systems and networks. Most recently, new technologies have been developed that have allowed television programs to be transmitted as multicast, e.g., IP multicast, digital bit streams of multiplexed video and audio signals delivered to users or client subscribers over packet switched networks.

Statistical multiplexing video, which uses variable bit rate (VBR) encoding, enables more services to be carried in the same bandwidth at the same perceived video quality level as a smaller number of services encoded at constant bit rate (CBR). Alternatively, statistical multiplexing enables better quality for the same number of services relative to CBR. In general, statistical multiplexed groups with more video services, e.g., >10, included in them are more efficient than statistically multiplexed groups with fewer video services, e.g., <4.

MPEG-2 Multiple Program Transport Streams (MPTS) over dedicated delivery mechanisms such as quadrature amplitude modulation (QAM) provide a robust platform for statistical multiplexing and can result in very efficient video encoding and delivery. Since new systems are moving to IP delivery, this brings new challenges such as lost packets and large amounts of jitter as compared to today's MPTS-based delivery systems. In addition, "over the top" consumption on $3^{rd}$ party devices including smartphones, tablets, set top boxes, game consoles and smart TVs has become a requirement, with such viewing occurring both in and out of the residence, often over Wi-Fi or mobile networks of indeterminate quality. This has led to widespread adoption of Adaptive Bit Rate (ABR) technology as exemplified by Apple's HLS, Microsoft's Smooth Streaming, Adobe HDS and MPEG DASH, the new international standard for ABR.

ABR streaming is a technology that works by breaking the overall media stream into a sequence of small HTTP-based file downloads, each download loading one short segment of an overall potentially unbounded transport stream. As the stream is played, the client device (e.g., the media player) may select from a number of different alternate streams containing the same material encoded at a variety of data rates, allowing the streaming session to adapt to the available data rate. For example, ABR as commonly implemented today typically comprises 3-15 encodings of the same content in CBR format over a wide range of bitrates, e.g., 64 kbps-8 Mbps and resolutions, e.g., Common Intermediate Format (CIF)—1080p. The present disclosure is applicable to such ranges as well as ultra high definition video standards that are coming next, such as 4K and 8K.

These streams are all chunked or packaged in a synchronized manner such that a client makes an HTTP request for the next chunk of the program, typically a 2-10 second segment, at the bitrate and other parameters it believes it can best support based on its capabilities as well as its determination of available network bandwidth over its recent history. Using this technique, the client can smoothly shift up or down in bitrate, maintaining program continuity, under varying network conditions. These ABR clients also typically buffer a few of these chunks, thus enabling retries for lost packets as well as overcoming jitter, or significant downshifting if network capacity decreases abruptly, and these techniques enable a typically good user experience over data paths of indeterminate quality.

While the flexibility provided to subscribers by IP ABR are very significant and compelling, there are drawbacks, especially to service providers, compared to the legacy of QAM MPEG-2 TS delivery:

Services are unicast, costing substantial bandwidth when multiple viewers are consuming the same linear content.

CBR encoding is not as efficient as VBR, costing bandwidth.

Network processing and content storage costs are higher because the same program is encoded and stored several times at different bitrates/resolutions.

Recently, the use of multicast for popular linear programming within a service provider's network has been proposed, which can overcome one or more of the drawbacks listed above.

FIG. 1 shows an example of an architecture that can be used to deliver video and other content and services to users associated with a variety of different client devices in accordance with an embodiment of the disclosure. Video streaming system 100 includes an ABR transcoder device 110, ABR packager 120, multicast server 130, network 140, edge cache server or gateway 150 and a set of media devices, including a personal computer (PC) 160, phone/tablet 170 and set top terminal 180. As used herein, media devices, client devices and player devices may be used interchangeably to refer to clients or users.

Multicast server 130 may transmit sets of video streams to media devices 160, 170, 180, via connection or network 140. A set of video streams may be for a media program, such as a movie, a television program etc. Each video stream in a set of video segments, also referred to as a profile, where each segment is typically two to ten seconds of media content (e.g., video, audio, captions, subtitles, etc.). A set of video streams or profiles may include thousands of video streams for a media program, such as a two-hour movie. The sets of video streams may be provided to multicast server 130 from ABR transcoder device 110. ABR transcoder device 110 may include a number of transcoder resources (not shown) where each transcoder resource may provide a set of video streams having unique encoding parameters (e.g., a bit rate, a resolution, etc.).

As used herein, a video program or asset refers generally to a movie or television program. For ABR delivery, each video program asset is transcoded into multiple profiles. As used herein, a profile is an instance of the asset encoded at a particular set of parameters, e.g., codec, resolution and bitrate. Each profile is divided into chunks or segments (e.g., two seconds, ten seconds, etc.) for delivery to the client devices.

In some embodiments, ABR transcoder device 110 is configured to receive video content in video content streams (not shown) from a content/program provider (not shown) over any number of possible distribution networks with the goal of delivering this content to subscriber media devices 160, 170, 180 as an ABR streaming service. As used herein, transcoder device may refer to any device that encodes content into an acceptable format for ABR streaming. The video content stream may be uncompressed video or compressed video (e.g., MPEG-2, H.264 or MPEG-4, AVC/H.264, HEVC/H.265, etc.) according to adopted and proposed standards or proprietary video compression technologies (e.g., Google VP9).

In some embodiments, The ABR transcoder device 110 supplies programming content to the ABR Packager 120 at different bit rates. That is, for any given service (e.g., program) ABR transcoder device 110 provides multiple media streams for that service, which require different amounts of bandwidth to be transmitted. For instance, ABR transcoder device 110 may provide multiple media streams of a given service at e.g., 2, 4, 8 and 15 Mbps, thereby providing four levels of quality, increasing at the higher bitrates.

In some embodiments, ABR transcoder 110 is configured to receive linear programs from one or more content/program providers. For simplicity, both encoders and transcoders are referred to herein as transcoders. Such linear programs may include programming provided by network providers such as ABC, NBC, TNT and HBO, live sporting events such as football and soccer games, news events such as press conferences or election results, or movies or TV programs. In some embodiments, the linear programs are scheduled, e.g., not available on demand.

ABR transcoder 110 is configured to transcode each linear program into ABR groups or bouquets. As used herein, an ABR bouquet refers to an ABR program that has been transcoded into multiple streams, each at a different set of parameters, e.g., average bitrate and/or resolution. In some embodiment, the instantaneous bitrate of each stream in a bouquet is constant, with the total bitrate for the bouquet also being constant. In other embodiments, the instantaneous bitrate of each stream in a bouquet is variable, with the total bitrate for the bouquet being constant or approximately constant. In some embodiments, the instantaneous bitrate of each stream in a bouquet is variable, with the total bitrate across all bouquets for multiple programs being constant or approximately constant.

The ABR Packager 120 is responsible for receiving the transcoded profiles from the transcoder 110 and segmenting/packaging them into the specific transport container, or format, for the particular ABR service, e.g., HLS, Smooth Streaming, or MPEG DASH among others. In some systems, ABR media is made available in multiple formats, or packages to accommodate multiple types of media clients with differing requirements; in such scenarios, there may be one or more ABR Packagers, 120, to accomplish this process.

ABR Packager 120 is configured to receive the ABR bouquets from ABR transcoder 110 and separate the bouquet streams into streams of fixed duration, e.g. segments. In some embodiments, the segments are approximately 2-10 seconds in duration. It should be appreciated that ABR transcoder 110 and/or ABR Packager 120 keep multiple program variants aligned with each other and segmentable at desired duration boundaries so that a client can smoothly shift up and down based on available client capabilities and available network bandwidth.

In some embodiments, multicast server 130 is configured to receive the segmented bouquets from ABR packager 120, and deliver each stream within a bouquet individually, but as if being multicast. In other words, the multicast server 130 provides each stream from a bouquet in its own individual transport stream, e.g., single program transport stream (SPTS). In some embodiments, multicast server 130 may first wrap the transport streams in another protocol such as the NACK-Oriented Reliable Multicast (NORM) in order to improve the reliability of multicast delivery, which is not connection-oriented and does not therefore have a defined retransmission technique for missing or errored packets.

In some embodiments, a sort of "statistical multiplexing" is applied to the multicast transport streams. As used herein, "statistical multiplexing" is used to describe the concept of encoding across a broad bundle of linear content concurrently such that individual programs within that bundle and profiles within individual program bouquets can be given more or less bits at any given time based on the complexity of that program relative to other programs in the bundle at that instant. However, since each program profile is packaged as an SPTS, it will appear as a variable bit rate (VBR) stream when looked at in isolation. When all the linear profiles within the broad bundle of content are delivered concurrently, the overall package may resemble a statistical multiplexed bundle.

As provided above, multiple SPTS versions of each linear program (e.g., for each stream in a program bouquet) may be produced, with each version, or profile, having the resolution and target average bitrate that results in a perceived quality similar to that desired in the traditional CBR encoding method of ABR. However, since VBR encoding is being used, this average bitrate is on the order of 20-40% less than the CBR case.

In some embodiments, the multicast server 130 is configured to assemble the multicast streams to achieve this overall CBR intent in the multicast bundle it transmits to the network 140. For example, in some embodiments, the multicast server 130 is configured to transmit interleaved transport streams into the network at a regulated data rate a small percentage above the total bitrate of all the transport streams, smoothing the data flow into the network while insuring gateways and clients receive the content before it is needed. Such an approach may avoid bursty spikes across the network and makes the multicast service more of a "good citizen" on the network. For example, if the total bitrate required by the multicast is 400 Mbps and the total network capacity is 1.2 Gbps, it may be more desirable for the service provider and other customers of the network if the multicast server meters the multicasts out at ~500 Mbps, leaving 700 Mbps+/− for other applications at all times, rather than bursting it out at 1.2 Gbps for ⅓ of the network time and then being idle ⅔rds of the time. In this latter scenario, other applications would be totally blocked by the multicasts ⅓ of the time and would have full pipe access ⅔rds of the time, but this may lead to unacceptable performance for many time sensitive applications.

As used herein "streaming" is used to indicate that the data representing the media content is provided over a network to a client device and that playback of the content can begin prior to the content being delivered in its entirety (e.g., providing the data on an as-needed basis rather than pre-delivering the data in its entirety before playback). As is well known to those of ordinary skill in the art, the transport of media streams preferably uses a video encoding standard, such as MPEG-2, and a transport standard such as MPEG-2 Transport Stream, MPEG-4, or Real-Time Protocol (RTP), as well as coding standards for audio and ancillary data. Higher end client devices such as set top terminals typically receive content encapsulated in an MPEG-2 Transport Stream whereas lower end client devices such as a PDA receive content encapsulated using a transport protocol such as the real-time protocol (RTP).

In some embodiments, network 140 is a managed IP network. In some embodiments, the managed IP network includes the ability to assign specific routes, allocate reserved or dedicated bandwidth, assign Quality of Service criteria or assign priorities to different classes/types of services. In some embodiments, network 140 may include the any network infrastructure for which a service provider (e.g., the one providing services across network 140) either owns, leases, or otherwise has contractual agreements/relationships that enable implementation of these QOS techniques. Network 140 may include wired links and wireless links. It will be understood that the various references made herein to "media" and "video" include both video content and audio content and may include ancillary data such as captions, teletext or other markers such as scene, chapter or ad break indicators.

As shown, system 100 includes an edge cache server or gateway 150. Gateway 150 is a server located at the edge of the network closer to the client devices 160, 170, 180. Gateway 150 allows network 140 to scale delivery to a large number of clients by storing the content closer to the edge of the network and directly serving content to the client devices 160, 170, 180. In some embodiments, gateway 150 is in the home as a traditional cable service provider, e.g., Comcast. In other embodiments, gateway 150 is at a mobile operator's site, where they transition from their wired network to their wireless network using a broadcast mode, e.g., LTE broadcast. In other embodiments, gateway 150 is an edge cache in an apartment/townhouse at the transition from the external network to the building to the in-building networking.

While shown as particular client devices, client devices 160, 170, 180 may include, without limitation, PCs, PDAs, portable computers, media centers, smart TVs, portable media players, mobile telephones, smartphones, and set-top boxes.

In some embodiments, the encoded content may include additional information related to the content of the video stream(s) which may be signaled using a protocol such as SCTE-35 (e.g., as metadata). Any suitable device (e.g., content/program provider (not shown), transcoder device 110, ABR packager 120) may provide the additional information signaling. For example, metadata may be passed by transcoder device 110 to ABR Packager 120. Thereafter, ABR Packager 120 may include the appropriate information as provided by the metadata.

In some embodiments, a traffic index is assigned to each program received from the content/program providers. The traffic index may be a value or indicator that reflects the volume of traffic expected to be associated with the program by client devices. For example, the traffic index may correspond to how popular a certain program or series is on a television channel. Alternatively, the traffic index may correspond to how popular a television channel is or how popular a sporting event is anticipated to be.

Each media stream delivered by the ABR transcoder 110 may be logically divided into a series of programs that have a predetermined duration. Each program may also be divided into a series of segments having a predetermined duration. Each media stream includes a traffic index for each program, which may be carried in metadata or other syntax formats. The traffic index is one measure that gives information regarding the popularity or expected popularity of each program. As will be appreciated, each segment of a linear program has the same traffic index as the other segments for that program during its initial showing or broadcast.

In some embodiments, when a program is broadcast, it will have a certain traffic index or expected popularity. But after the fact, there are invariably short snippets or highlights from the program that become the "water cooler" discussion or end up being YouTube-type highlights and thus may end up with much higher "after the fact" traffic indexes. As used herein, the traffic index calculated for each program is related to the initial "scheduled" consumption.

The traffic index for each program may be calculated in any of a variety of different ways. For example, the traffic index may be calculated based on metrics obtained by or provided to a service provider. Suitable metrics may include Nielsen ratings of prior showings of a program or series, number of viewers in a region for previous showings or episodes of a program, number of viewers that watched a channel the night before or the week before, anticipated number of viewers based on viewer feedback, anticipated number of viewers based on social media interest or chatter, or the relevance of a program to the specific demographics of a geographic area. Alternatively, the service provider could set a predetermined threshold that traffic index must exceed before the program associated with the traffic index is selected to be part of the multicast bundle. For example, the predetermined threshold may be a certain number of viewers, such as a minimum of 1,000 viewers or client devices. Alternatively, the service provider may have a multicast bundle capacity through their network of 100 simultaneous programs, so they might select the 100 programs with the highest anticipated traffic indexes over each period of time to include in the multicast bundle.

Figure 2:
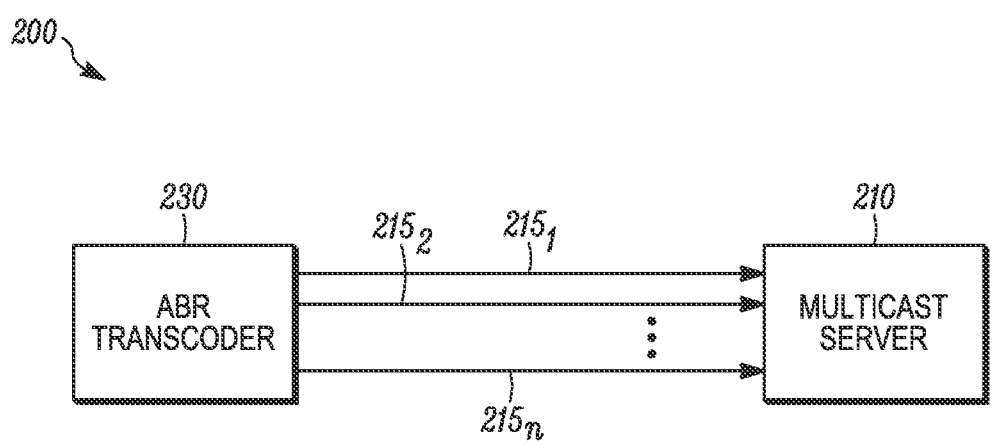
FIG. 2 shows a logical block diagram of the multicast server and ABR transcoder of FIG. 1.

FIG. 2 shows a logical block diagram of the multicast server and ABR transcoder of FIG. 1. In the example shown in FIG. 2, the multicast server 230 receives three streams $215_1$, $215_2$ and $215_3$ for a single program 215 from the ABR transcoder 210. In some embodiments, ABR packager (not shown) is integrated with ABR transcoder 210. Of course, the ABR transcoder 210 more generally may send any number of streams to multicast server 230. As mentioned above, the ABR transcoder 210 provides multiple media streams for each program, each encoded at a different and variable bit rate. In this example the ABR transcoder 210 provides media streams $215_1$, $215_2$, $215_3$ for program 215. Although three media streams are provided in this example for program 215, more generally any suitable number of media streams for any suitable number of programs may be provided which may differ from program to program.

In some embodiments, the bit rate is the reason for the different profiles within a bouquet since this is typically the delivery issue (squeezing it through congested networks), but there are generally other encoding differences such as resolution, and sometimes, codecs selected. These other profiles are sometimes created to support device types that only have certain capabilities. E.g., Netflix has a particular profile targeted to a specific gaming device that only supports a non-typical audio codec. The present disclosure provides for bouquets having different parameters in addition to or in place of different bitrates.

Figure 3:
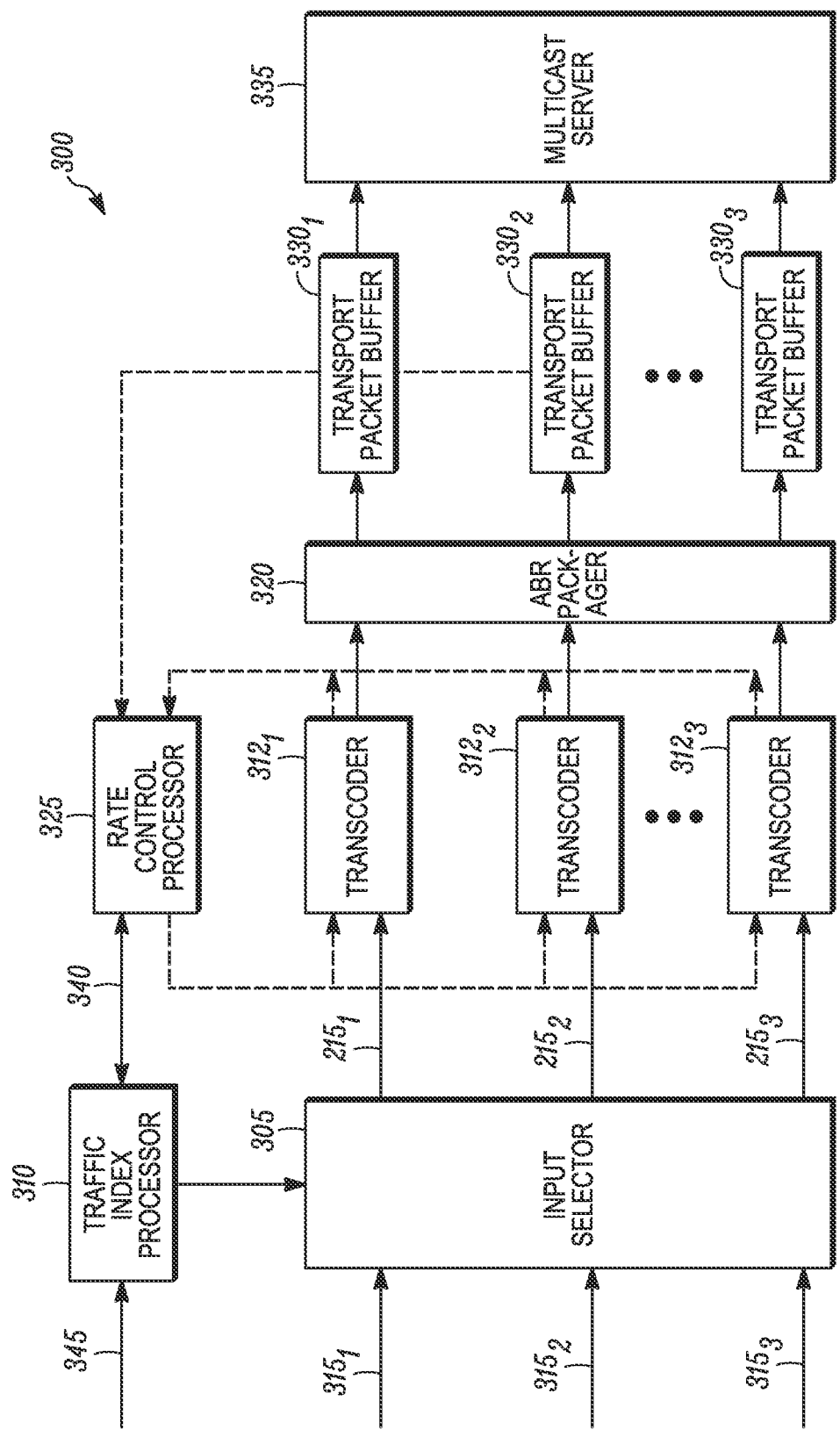
FIG. 3 shows an example of a multicast system and content flow in accordance with an embodiment of the disclosure.

FIG. 3 shows an example of a multicast system and content flow in accordance with an embodiment of the disclosure. The traffic index is used to select which of all the available current programs are to be included in the multicast bundle. In this example, the system 300 includes traffic index processor 310 that receives the traffic index values for all the current programs. $315_1$, $315_2$, $315_3$ via stream 345. Traffic index processor 310 directs input selector 305 to only forward the desired number of programs, e.g., the number of programs for the multicast bundle, with the highest traffic index to the transcoders in communication with the multicast server. Programs that are not selected for multicast, e.g., those with lower traffic indices, may be processed and made available for typical ABR unicast consumption. For example, they may still be ABR transcoded, packaged and published such that clients can still access these programs as typical ABR unicast programs. The rate control processor 325 monitors the complexity of each of the programs passing through the transcoder elements 312 and adjusts their parameters such that each program's output bitrates are variable, typically with the target of maintaining constant quality, or fidelity, over the course of the program while managing the total bitrate of all the transcoded services to achieve an overall constant bitrate across the total transcoded bundle of ABR programs targeted for multicast. The ABR transcoder elements 312 send the transcoded media streams to the ABR packager 320, which provides a plurality of segmented bit streams, with each segmented bit stream including an individual program. The segmented bit stream output from the ABR packager 320 is sent to transport packet buffer elements $330_1$, $330_2$ and $330_3$ and then to multicast server 335 (see FIG. 2) for transmission across a network channel to the appropriate gateway and/or client devices.

As mentioned above, the rate control processor 325 allocates bandwidth (e.g., bit rates) to the programs that are to be delivered to client devices. In some cases the rate control processor 325 may also have access to minimum and maximum bandwidth limits or specific quality metrics established for the various selected programs as well as bandwidth targets for the entire bundle of programs that is to be multicast. In some embodiments, a stream that is more complex than another stream will be allocated more bandwidth and hence assigned a higher bit rate, and the assigned bit rate will generally vary within each program based on its complexity at each instant in time as well as the relative complexity of all the other programs being prepared for the same multicast bundle. However, the total bandwidth for a bundle of programs will remain relatively constant, e.g., at or below the bandwidth limit.

In some embodiments, if maximum and minimum bandwidth limits are established by each client device (or group of client devices) that is receiving a respective stream, the rate control processor 325 will generally attempt to honor all minimum bandwidth limits first for its bundle. If the sum total of all minimum bandwidths for a given segment exceeds the total bandwidth available to all the streams, the rate control processor 325 distributes the total bandwidth amongst all the streams in proportion to their minimum bandwidth limits. In some embodiments, there may also be a communication link 340 between the traffic index processor 310 and the rate control processor 325 that is used to evaluate appropriate bit allocations across the programs within the bundle when the total bandwidth requirement exceeds the total bandwidth available. Otherwise, each program is typically given its minimum bandwidth for that segment while meeting its quality target.

The transcoded media streams are sent by the ABR transcoder elements $312_1$, $312_2$ and $312_3$ to the ABR Packager 320. The ABR Packager 320 segments each media stream per the appropriate packaging specification, e.g., HLS, MPEG DASH, converting them to small files and sends them to the corresponding transport buffer $330_1$, $330_2$ and $330_3$ for transmission to the multicast server 335. Multicast server 335, in turn, multicasts these packaged media files to the gateway devices in a managed fashion such that the segment files for each program are interleaved approximately time aligned to the way each program's segments were output from the ABR packager such that the total bundle being delivered by the multicast server is being output at a nearly constant bitrate. The multicast server 335 may apply additional processing such as applying the NACK Oriented Reliable Multicast (NORM) protocol or similar to improve the robustness or error resilience of the resulting multicast delivery across the network to the gateway devices. The multicast server 335 may also meter the flow of the multicast data into the network to a bitrate somewhat higher than the total bitrate required for all the services being multicast, but at less than the available network capacity in order to smooth the network loading.

Figure 4:
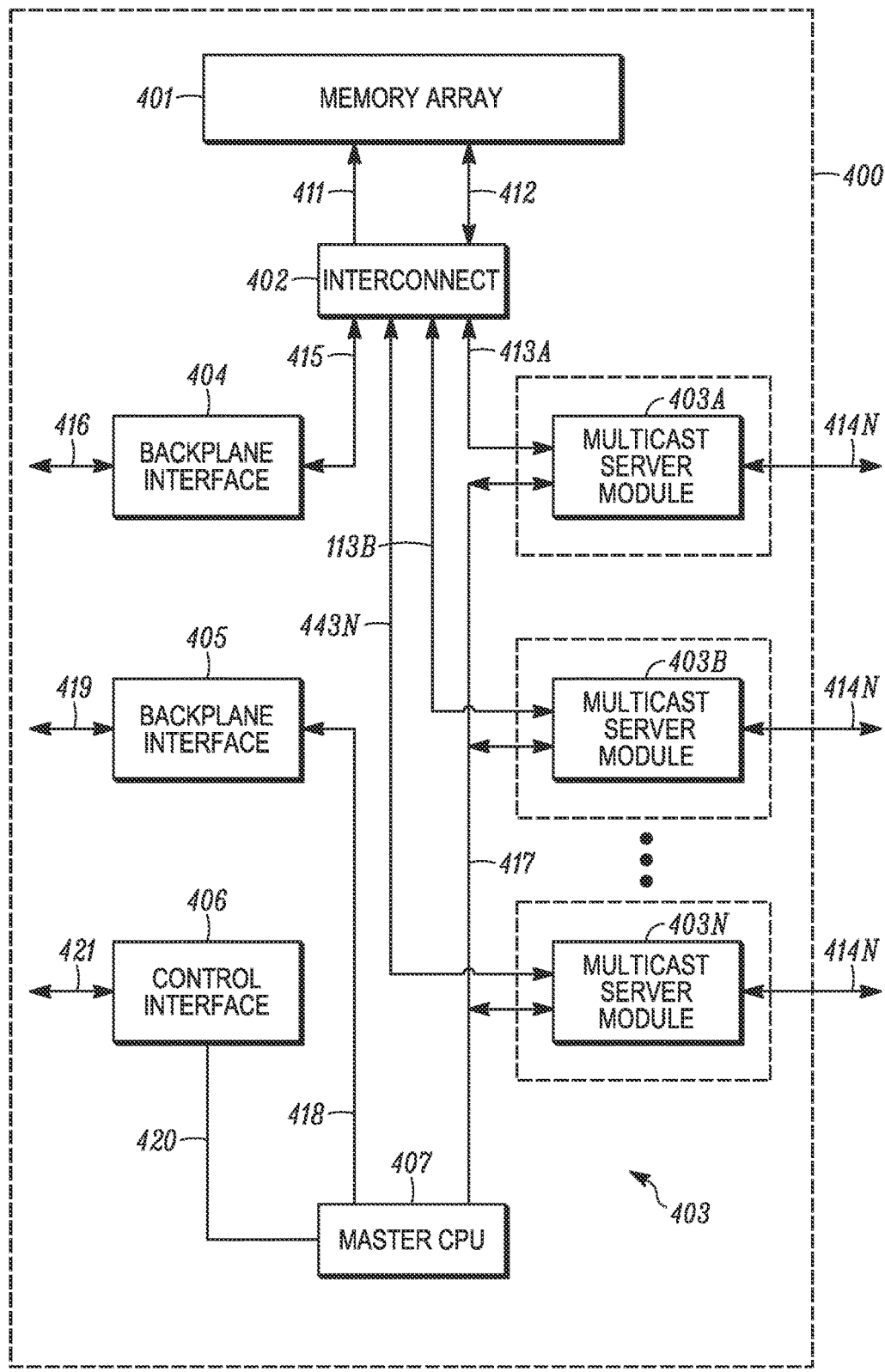
FIG. 4 shows an example of a streaming server that may be employed as the multicast server shown in FIG. 1.

One example of a multicast server that may employ the methods, techniques and systems described herein is shown in FIG. 4. The multicast server 400 shown therein is particularly suitable for streaming live or real-time (broadcast) content or on-demand content such as video-on-demand to client devices. While the server 400 will be used for purposes of illustration, those of ordinary skill in the art will recognize that the methods, techniques and systems described herein are also applicable to wide variety of the other multicast servers employing different architectures.

The multicast server 400 includes a memory array 401, an interconnect device 402, and multicast server modules 403 *a* through 403 *n* (403). Memory array 401 may be used for temporary data storage as the media files are processed through the server. Such memory arrays may be built from conventional memory solid-state memory including, but not limited to, dynamic random access memory (DRAM) and synchronous DRAM (SDRAM). The interconnect 402 controls the transfer of data between the memory array 401 and the multicast server modules 403.

Control functions, or non-streaming payloads, are handled by the master CPU 407.

Program instructions in the master CPU 407 determine the location of the desired content or program material that is buffered in memory array 401. The memory array 401 is a large-scale memory buffer that can store video, audio and other information. The content provided to each gateway device is transmitted as a bundle of individual program streams, each of which is multicast.

If the predetermined or required content segment is not already resident in the memory array 401, a request to load the program is issued over signal line 418, through a backplane interface 405 and over a signal line 419. An external processor or CPU (not shown) responds to the request by loading the requested program content over a backplane line 416, under the control of backplane interface 404. Backplane interface 404 is connected to the memory array 401 through the interconnect 402. This allows the memory array 401 to be shared by the multicast server modules 403, as well as the backplane interface 404. The program content is written from the backplane interface 404, sent over signal line 415, through interconnect 402, over signal line 412, and finally to the memory array 401.

When the first block of program material has been loaded into memory array 401, the multicast output can begin. Data playback is controlled by a selected one or more multicast server modules 403. If the multicast server module 403 *a* is selected, for example, the multicast server module 403 *a* sends read requests over signal line 413 *a*, through the interconnect 402, over a signal line 411 to the memory array 401. A block of data is read from the memory array 401, sent over signal line 412, through the interconnect 402, and over signal line 413 *a* to the multicast server module 403 *a*. Once the block of data has arrived at the multicast server module 403 *a*, the transport protocol stack is generated for this block and the resulting primary media stream is sent to a transport network over signal line 414 *a*. The transport network then carries the primary media stream to the gateway devices. This process is repeated for each data block contained in the program source material while maintaining the timing of each data block relative to the corresponding data blocks of all the other programs being similarly processed in the server.

Figure 5:
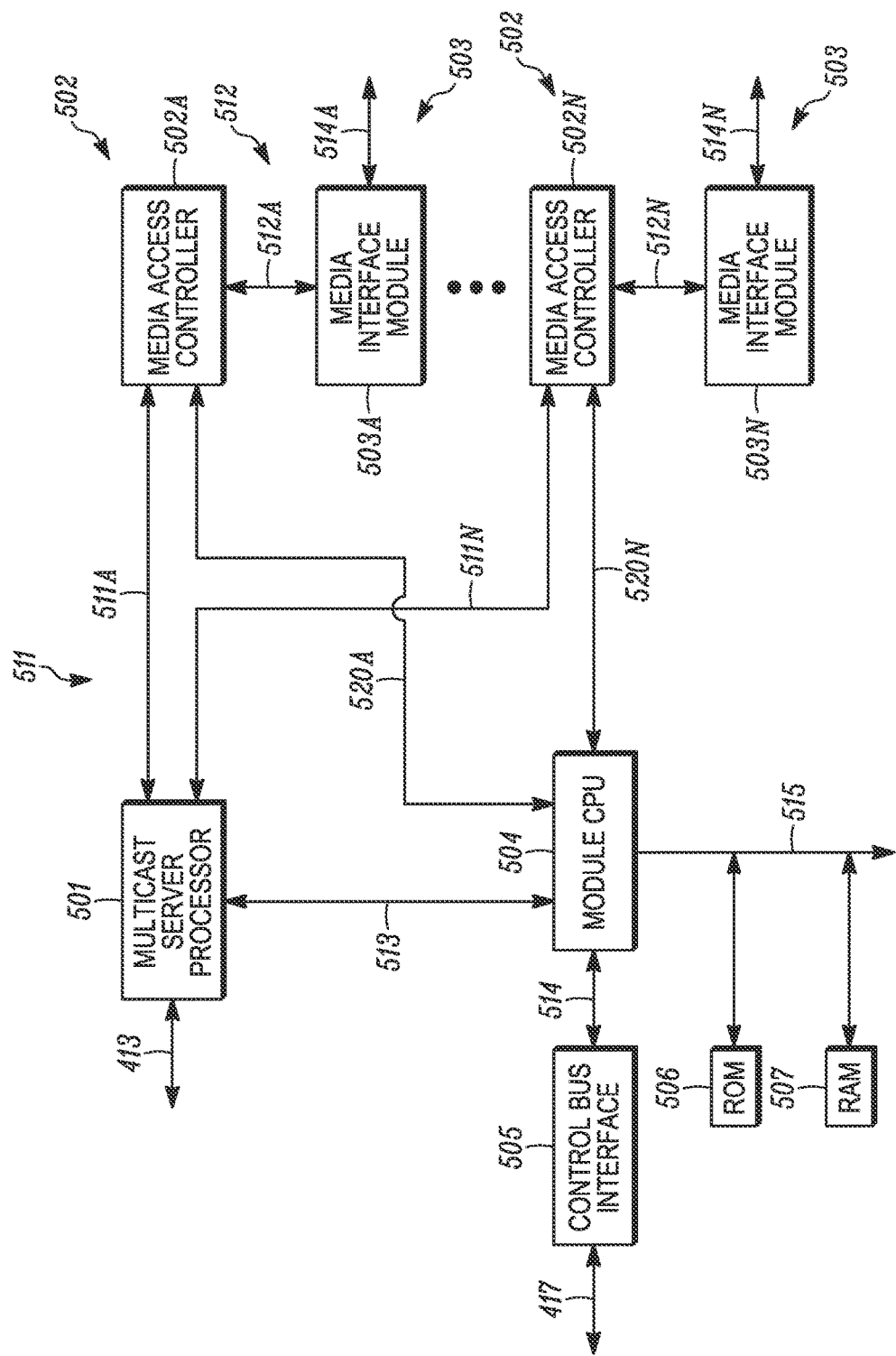
FIG. 5 is a block diagram of one illustrative implementation of the multicast server modules shown in FIG. 4.

FIG. 5 is a block diagram of one illustrative implementation of the multicast server modules 403 shown in FIG. 4. A multicast server processor (SSP) 501 serves as the automatic payload requester, as well as the protocol encoder and decoder. The SSP 501 requests and receives data payload over signal line 413. It then encodes and forms network level packets, such as TCP/IP or UDP/IP or the like. The encoded packets are sent out over signal lines 511*a*-511 *n* (511) to one or more media access controllers (MACs) 502 *a*-502 *n* (502). The media access controllers 502 generate the individual media streams in the bundle by encapsulating the encoded packets in data link level frames or datagrams as required by the specific physical network used. In the case of Ethernet, for example, the Media Access Controllers 502 also handle the detection of collisions and the auto-recovery of link-level network errors. The MACs 502 may also incorporate other metadata into the media streams such as signaling or processing instructions to facilitate the gateway's efficient reception of the multicast media streams.

The media access controllers 502 are connected utilizing signal lines 512 *a*-512 *n* (512), to media interface modules 503*a*-503 *n* (503), which are responsible for the physical media of the network connection. This could be a twisted-pair transceiver for Ethernet, Fiber-Optic interface for Ethernet, SONET or many other suitable physical interfaces, which exist now or will be created in the future, such interfaces being appropriate for the physical low-level interface of the desired network. The media interface modules 503 then send the media streams in the bundle over the signal lines 514 *a*-514 *n* (514) to the appropriate client device or devices.

In practice, the multicast server processor 501 divides the input and output packets depending on their function. If the packet is an outgoing payload packet, it can be generated directly in the multicast server processor (SSP) 501. The SSP 501 then sends the packet to MAC 502 *a*, for example, over signal line 511 *a*. The MAC 502 *a* then uses the media interface module 503 *a* and signal line 512 *a* to send the packet as part of a stream in the bundle to the network over signal line 414 *a*.

Figure 6:
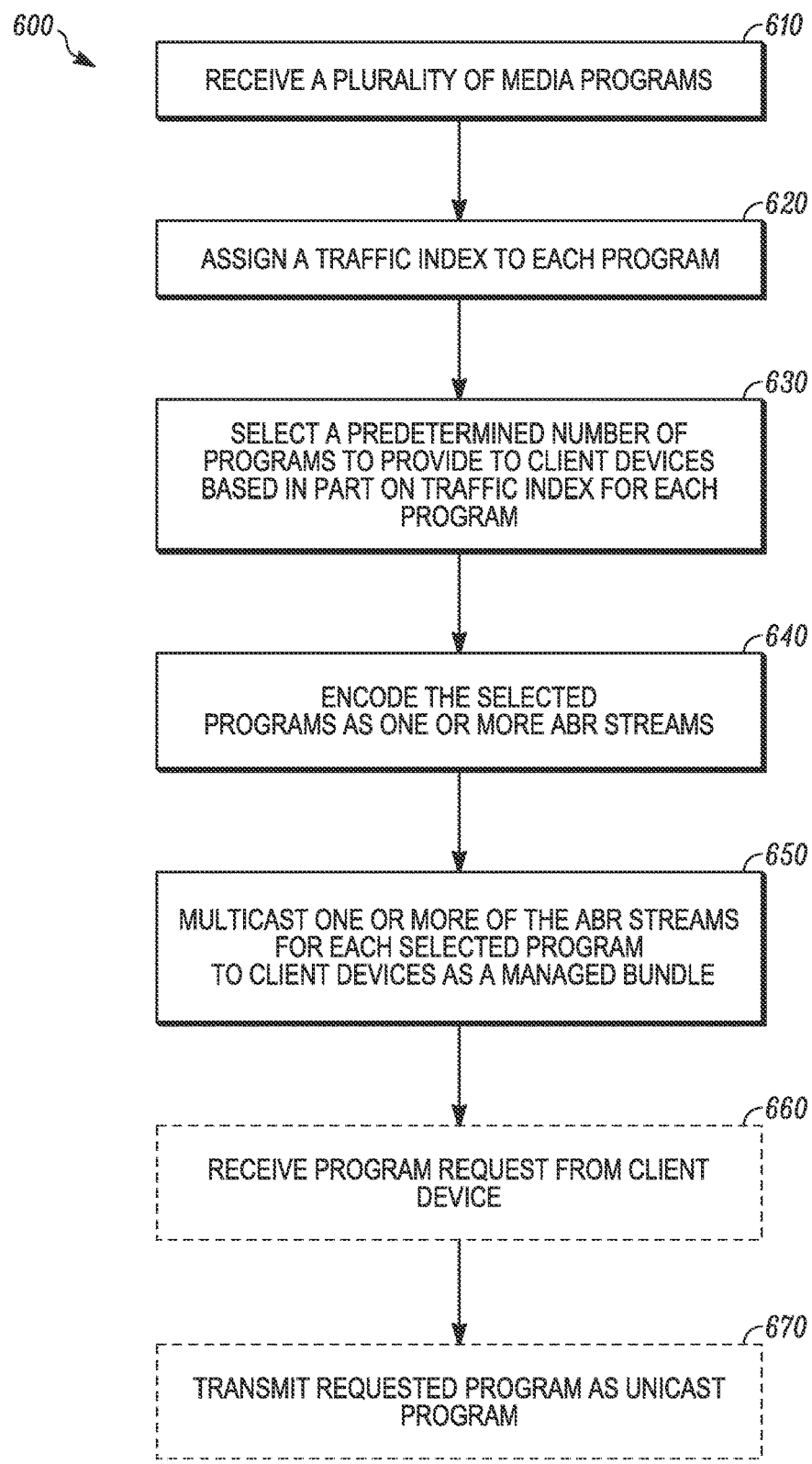
FIG. 6 is a flowchart showing an example of a method for delivering streaming media content to client devices over network devices in accordance with an embodiment of the disclosure.

FIG. 6 is a flowchart showing an example of a method for delivering streaming media content to client devices over network devices in accordance with an embodiment of the disclosure. In this example the method 600 begins at step 610 when an input selector 305 receives a plurality of media programs. Next, at step 620, a traffic index is assigned to each program of the media programs. Each traffic index reflects the popularity or expected popularity of each program. At step 630, a predetermined number of programs are selected to provide to the client or gateway devices based at least in part on the traffic index for each program. The selected media programs are encoded as VBR streams in an ABR format at step 640, applying rate control processing in order to maintain the desired quality level while minimizing program bandwidth. The encoded individual ABR programs are multicast over the network as a managed bundle to the client or gateway devices at step 650. At optional step 660, one or more client or user devices request programs from a gateway device. At optional step 670, the gateway checks to see whether the program request(s) match any of the programs it is currently receiving as multicasts. If there is a match, the gateway converts the multicast back to a unicast program in the client's requested ABR format and delivers it to the client. If there is not a match, the gateway forwards the client request to the network, where it is received by another controller (not shown) for processing.

Figure 7:
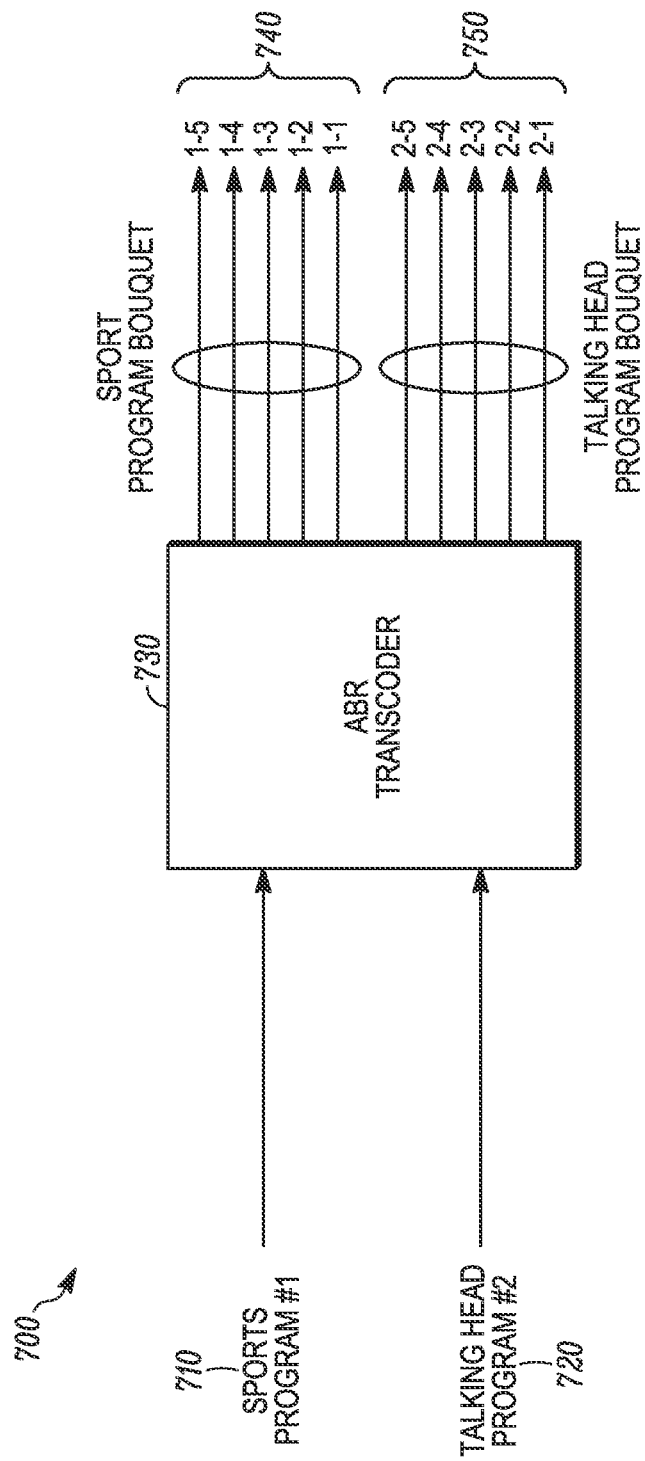
FIG. 7 shows a logical block diagram of content entering and exiting an ABR transcoder in accordance with an embodiment of the disclosure.

FIG. 7 shows a logical block diagram of content entering and exiting an ABR transcoder in accordance with an embodiment of the disclosure. As shown in diagram 700, two programs are provided that enter into ABR transcoder 730. The first program, sports program #1, is shown as stream 710. The second program, talking head program #2, is shown as stream 720. ABR transcoder 730 converts stream 710 into a sport program bouquet or bundle 740 made up of five streams or profiles 1-1, 1-2, 1-3, 1-4, 1-5 having different bitrates and/or resolutions. ABR transcoder 730 converts stream 720 into a talking head program bouquet or bundle 750 made up of five streams or profiles 2-1, 2-2, 2-3, 2-4, 2-5 having different bitrates and/or resolutions. Of the profiles, profile 1 (e.g., 1-1 and 2-1) has the lowest bitrate and/or resolution and profile 5 (e.g., 1-5 and 2-5) has the highest bitrate and/or resolution. In the present example, ABR transcoder 730 is configured to allocate a total of 20 Mbps to the two programs 710, 720 with five profiles in each program bouquet. In some embodiments, ABR transcoder 730 is configured to deliver constant quality at any of the selected profiles from the bouquets or bundles 740, 750.

Figure 8:
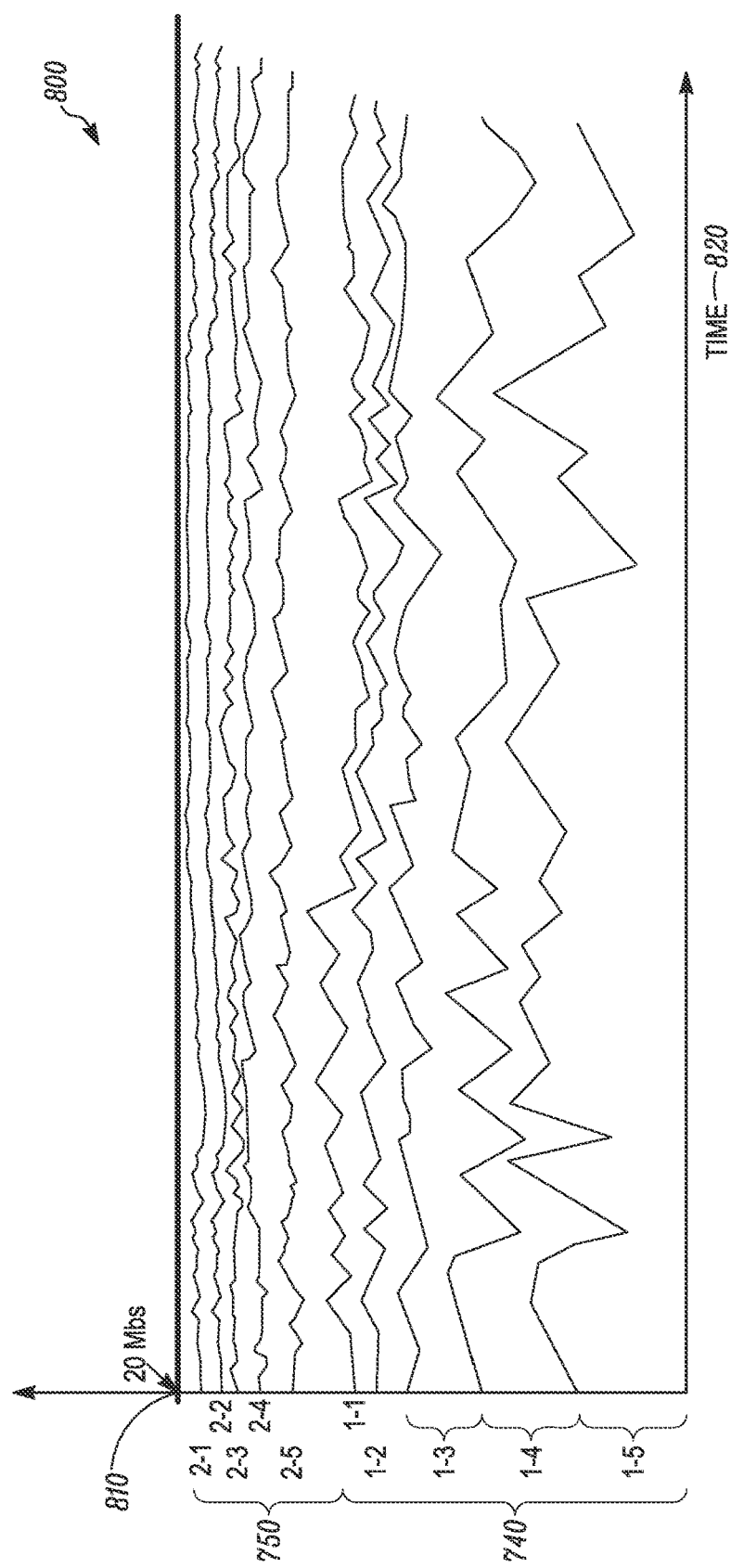
FIG. 8 is an illustrative graph of content after exiting the ABR transcoder of FIG. 7.

FIG. 8 is an illustrative graph of content after exiting the ABR transcoder of FIG. 7. In graph 800, the bitrate allocated to each of the bouquets 740 and 750 are plotted against time 820. As shown, a limit of 20 Mbps that transcoder 730 can allocate to the bouquets is provided as a dark limit line 810. Because program #1 is a sports program made up of bouquet 740, it requires much more bandwidth with more variability to maintain a constant quality as compared to program #2 (talking head program made up of bouquet 750).

Figure 9:
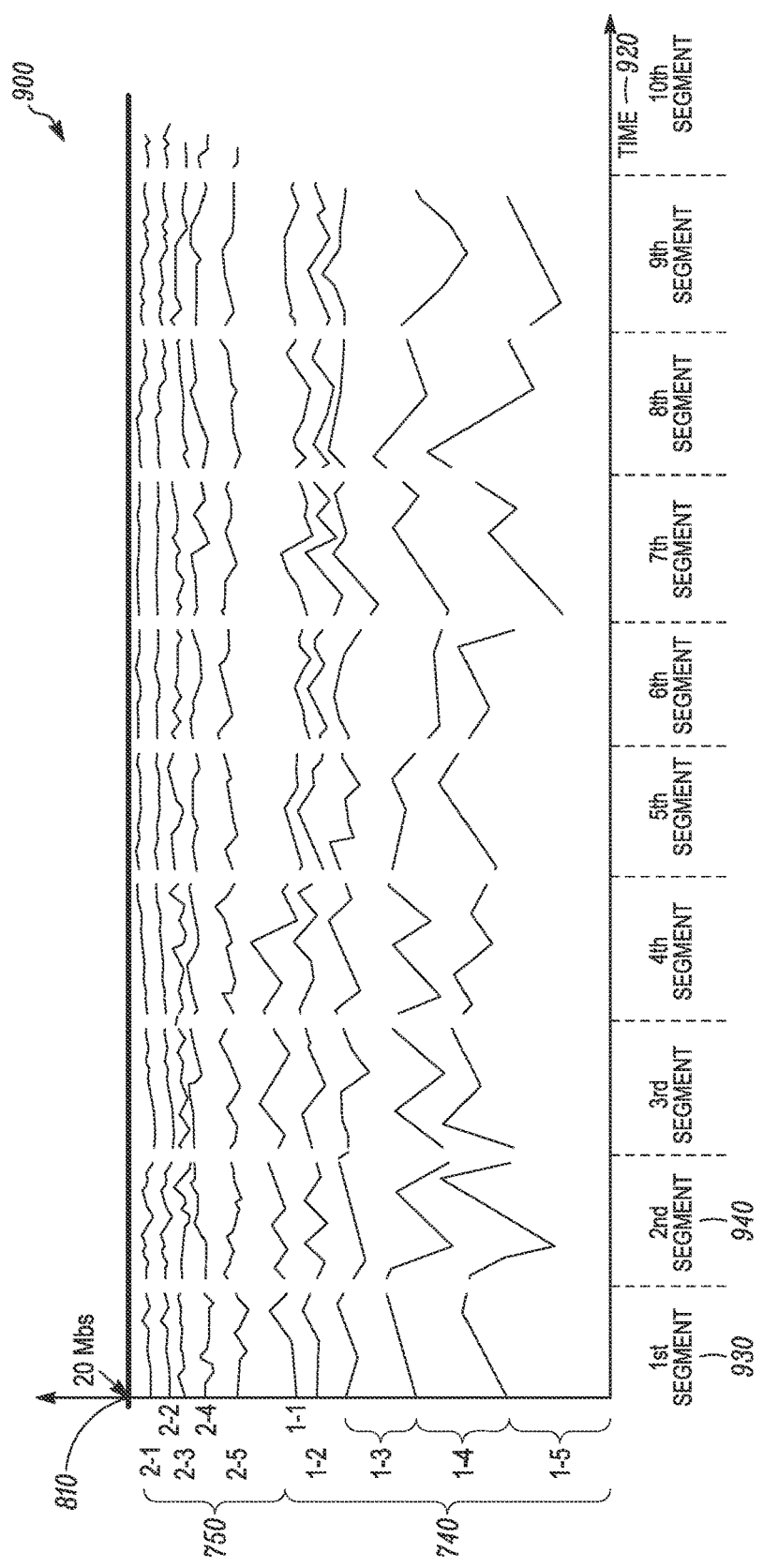
FIG. 9 is an illustrative graph of the content of FIG. 8 after exiting an ABR packager in accordance with an embodiment of the disclosure.

FIG. 9 is an illustrative graph of the content of FIG. 8 after exiting an ABR packager in accordance with an embodiment of the disclosure. In graph 900, the bitrate allocated to each of the bouquets 740 and 750 are plotted against time 920. As shown, a limit of 20 Mbps that transcoder 730 can allocate to the bouquets is provided as a dark limit line 910. However, because an ABR packager will break or segment each profile into segments, graph 900 illustrates the profiles broken into $1^{st}$ segments 930, $2^{nd}$ segments 940, and so on.

Figure 10B:
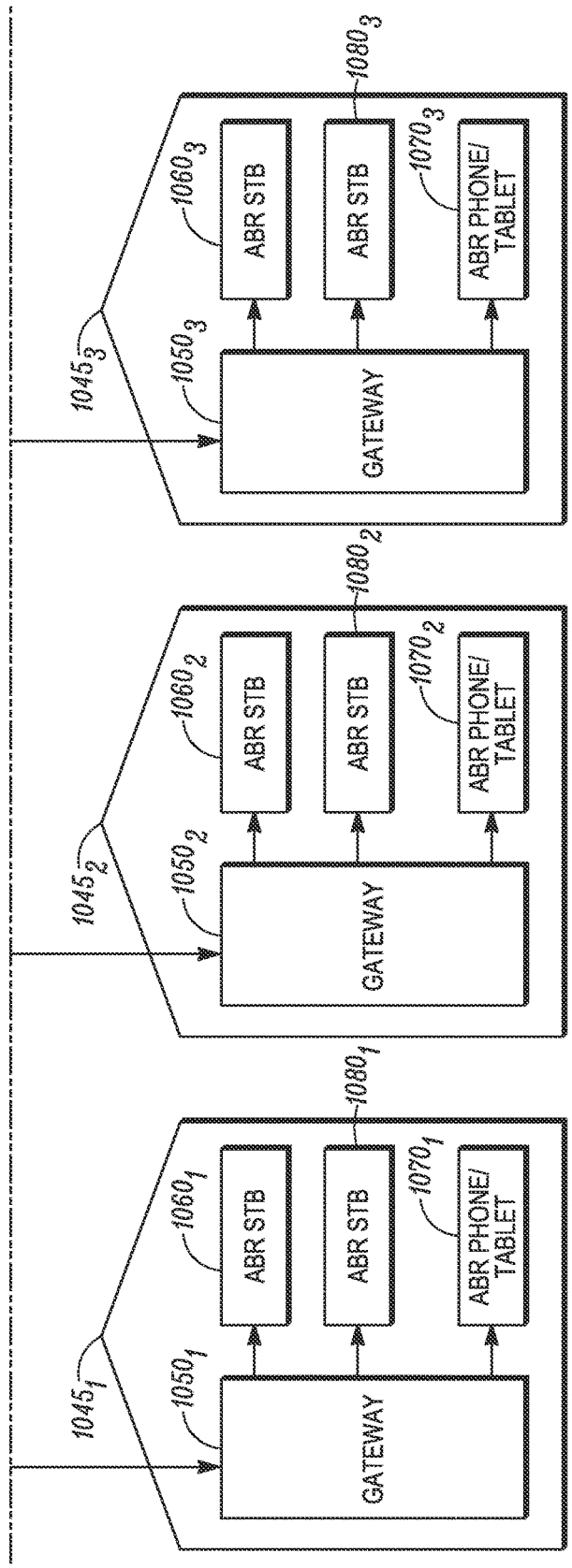
FIG. 10 (separated into FIGS. 10A-10B) shows an example of an architecture that can be used to deliver video and other content and services to users associated with a variety of different client devices in accordance with an embodiment of the disclosure.

FIG. 10 shows an example of an architecture that can be used to deliver video and other content and services to users associated with a variety of different client devices in accordance with an embodiment of the disclosure. System 1000 includes an ABR transcoder 1010, ABR Packager 1020, multicast server 1030, origin server 1035, network DVR (nDVR) 1045, content delivery network (CDN) 1055, converged cable access program (CCAP)/cable modem termination system (CMTS) 1065, service provider distribution network 1040, client environment 1045$_1$, gateway 1050$_1$, set top box 1060$_1$, phone/tablet 1070$_1$ and set top box 1080$_1$. As shown, linear A/V sources or streams 1005 are received by ABR transcoder 1010, where they are converted into multiple profiles for each program. Thereafter, the profiles are sent to ABR packager 1020, where they are broken into segments of predetermined duration. In one embodiment, the segmented profiles are sent to multicast server 1030, where program selection based on traffic index as described as above is performed. Thereafter, the selected programs are multicast as a bundle to CDN 1055 or CCAP/CMTS 1065 and then onto the client devices via service provider distribution network 1040. As shown, service provider distribution network 1040 may be in communication with a plurality of client environments 1045$_1$, 1045$_2$, 1045$_3$ each having a gateway 1050$_1$, 1050$_2$, 1050$_3$ set top box 1060$_1$, 1060$_2$, 1060$_3$ phone/tablet 1070$_1$, 1070$_2$, 1070$_3$ and set top box 1080$_1$, 1080$_2$, 1080$_3$. While shown as identical for illustrative purposes, each client environment 1045 may differ from each other significantly.

The total multicast bundle may be set to a bandwidth below the actual capacity of the IP pipe through which it is to be delivered. For example, in a network offering a total payload capacity of ~600 Mbps, the multicast bundle bandwidth at the transcoder may be set to 400 Mbps, leaving about 200 Mbps available for other data or video services across the same network. In some embodiments, the profiles or programs in the bundle may all be prioritized or assigned a specific Quality of Service (QOS) level above any of the other traffic permitted in the configured delivery pipe. The remainder of the delivery pipe can carry data traffic or other ABR unicast traffic, all of which are set to a lower priority than the main multicast bundle.

With the example above, a 400 Mbps network could support 28 multicast CBR HD ABR programs simultaneously assuming five variants of each program at 6.5, 4.0, 2.0, 1.0 and 0.5 Mbps, H.264. By using the multicast bundle approach in the transcoder instead, the same pipe would support 35-47 VBR HD ABR programs at the same perceived video quality. And, if because of packet ordering or jitter in delivery, the instantaneous bandwidth goes to 410 Mbps or 390 Mbps, the lower priority assigned to the other services would still enable all the multicast data to be delivered successfully.

In some embodiments, in the home, gateway 1050 is configured to convert the client "tuned" content from multicast to unicast so that the client can use the typical ABR client implementation as-is. This will work for in-home clients whether the client is a set top box 1060, 1080 on a reliable network such as Ethernet or MoCA, or connected wirelessly via in-home Wi-Fi. In the Wi-Fi scenario, client behavior remains as it does with CBR ABR streams today—if there isn't enough bandwidth available in the Wi-Fi link, the client downshifts to a lower bitrate/lower quality version of the stream. The service's manifest file would provide the long term average bitrate of each variant rather than the instantaneous max or min contained within each segment In another embodiment, the segmented profiles from ABR packager 120 are also published to an origin server 1035. This is useful in systems implementing time delay recording features such as network digital video recording (nDVR) 1045, which often includes both end customer/subscriber recording requests for time shifting as well as service provider features such as start over and look back that enable their subscribers to watch content they might otherwise miss by making such content available on demand for a period of time after its initial showing. In this scenario, because the VBR encoding was applied to the ABR profiles, generally to achieve constant quality at lower bandwidth requirements, the nDVR storage costs are reduced. And when subscribers later consume this content as unicast services via CDN 1055 and distribution network (e.g., CCAP/CMTS 1065 as might be representative in a cable operator's network) the VBR encoding again saves bandwidth through this distribution network even though it is a unicast service now instead of the multicast that was made available at the original program time.

The CDN, 1055, shown in FIG. 10 is typically employed to efficiently manage a service provider's backbone network and is well documented elsewhere, it serves the same purpose in this solution, especially for the nDVR scenario outlined in the previous paragraph, but it can also be used to more efficiently distribute the multicast services from 1030 across a distributed network.

Additional benefits associated with the present disclosure include:

Each of the programs in a multicast bundle can be recorded in the network as-is in support of nDVR, Start Over or Look Back services. These programs still have the benefit of VBR encoding vs. CBR, making them smaller in size for the same quality, and thus reducing storage costs and subsequent network delivery costs. When a subscriber selects such a program for later playback, it can be delivered from the network to the client as a standard unicast HTTP ABR session, using delivery bandwidth other than that "reserved" for the multicast ABR bundle(s).

(2) Similarly, individual programs can be saved on an in-home DVR or client device in support of the same services and benefits noted above in (1), plus no need for subsequent network bandwidth for delivery. Saving a program directly to a client in this manner enables offline content, e.g., storing it on a tablet.

Services recorded as in (1) or (2) can also be enabled for over-the-top delivery when the subscriber is out of their home and on a 3$^{rd}$ party network. The VBR encoding resulting from the original multicast bundle approach of these linear services still minimizes network bandwidth requirements.

Generic use of VBR encoding with provisionable max/min and long term average bitrates can generally improve ABR efficiency, independently of the multicast bundle approach. On thin delivery pipes where most of the traffic is on-demand ABR, use of VBR has the potential to cause more up/down shifting of individual clients based on network loading as compared to the actual concurrent chunk bandwidth need since such VBR streams would not be coordinated in time as they are when multicast. But in larger pipes, statistics should level out such instantaneous variations that would result from use of VBR vs. CBR content, and there should be some overall bandwidth savings as a result of VBR use, but less than that achieved in the preferred multicast bundle scenario.

In some embodiments, a traditionally statistically multiplexed MPTS may be produced and delivered via multicast to the home gateway, where the services selected by in-home clients would again use their standard ABR clients to request those services via HTTP and the gateway would perform the conversion. Use of a traditionally statistically multiplexed MPTS would consume a more consistent/uniform bandwidth across the multicast delivery to the home and may require some additional processing in the headend/network to be able to save individual programs into the typical SPTS required to support Start Over, Look Back or nPVR services.

As used in this application, the terms "component," "module," "unit," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although described specifically throughout the entirety of the instant disclosure, representative embodiments have utility over a wide range of applications, and the above discussion is not intended and should not be construed to be limiting, but is offered as an illustrative discussion of aspects of the disclosure. What has been described and illustrated herein are embodiments of the disclosure along with some of their variations. The terms, descriptions and figures used herein are set forth by way of illustration only and are not meant as limitations. Those skilled in the art will recognize that many variations are possible within the spirit and scope of the disclosure, wherein the disclosure is intended to be defined by the following claims—and their equivalents—in which all terms are mean in their broadest reasonable sense unless otherwise indicated.

What is claimed is:

1. A method of distributing content by a network operator, the method comprising:
   receiving a plurality of media streams, each media stream including a plurality of linear programs containing only adaptive bitrate video having a prescribed duration;
   assigning a traffic index for each of the programs contained within each of the media streams, each traffic index reflecting the volume of traffic expected to be associated with the program by a client device;
   selecting a predetermined number of the programs to provide to the client device dynamically as the programs are received;
   statistically multiplexing the selected programs into a managed bundle based at least in part on the traffic index for each of the programs, the traffic index based at least in part on the popularity of each of the programs;
   encoding said selected programs as individual adaptive bitrate streams; and
   streaming said encoded individual adaptive bitrate streams to client device over the network in IP as the managed bundle, wherein the adaptive bitrate streams in the bundle are multicast simultaneously to the client device with a substantially constant bitrate.

2. The method of claim 1, wherein encoding said selected programs as individual adaptive bitrate streams comprises encoding each program in a corresponding adaptive bitrate stream and providing the collection of corresponding adaptive bitrate streams as bundle of streams, each stream in the bundle having a particular time assignment.

3. The method of claim 2, further comprising:
   allocating bandwidth to the adaptive bitrate streams based on the collection of streams in the bundle.

4. The method of claim 3,
   wherein each of the adaptive bitrate streams is variable bitrate (VBR) encoded, and
   wherein uniform quality is delivered within each of the programs in the bundle by controlling the VBR encoding of each adaptive bitrate stream.

5. The method of claim 1, wherein each program comprises a plurality of segments having a prescribed duration.

6. The method of claim 1, wherein in encoding said selected programs as individual adaptive bitrate streams, each selected program comprises a plurality of profiles having different bitrates and/or resolutions.

7. The method of claim 6, wherein the plurality of profiles for each selected program are provided together in the individual adaptive bitrate stream for said program.

8. The method of claim 6, wherein the plurality of profiles for each selected program are provided separately in individual adaptive bitrate streams.

9. The method of claim 6, wherein the plurality of different bitrate comprises approximately 3 to 15 constant bitrates.

10. The method of claim 6, wherein the plurality of resolutions comprises a resolution range of approximately common intermediate format (CIF) to 1080P.

11. The method of claim 1,
wherein the traffic index is calculated by metrics obtained by or provided to a service provider,
wherein the metrics are selected from the group consisting of: Nielsen ratings of prior showings of a program or series, number of viewers in a region for previous showings or episodes of a program, number of viewers that watched a channel the night before or the week before, anticipated number of viewers based on viewer feedback, social media discussion popularity.

12. The method of claim 1, further comprising:
storing the encoded individual adaptive bitrate streams.

13. The method of claim 12, further comprising:
providing a stored encoded individual adaptive bitrate stream to a client device upon request.

14. The method of claim 13, wherein the encoded individual adaptive bitrate stream comprises a plurality of profiles for a program.

15. The method of claim 13, wherein the client device's request comprises a start over or look back recorded service.

16. The method of claim 1, wherein the plurality of programs comprise one or more of television shows, movies, sports programs, television channels, news and special events.

* * * * *